Sept 10, 1957   W. F. BLESI   2,805,527
MACHINE TOOL
Filed Sept. 6, 1955
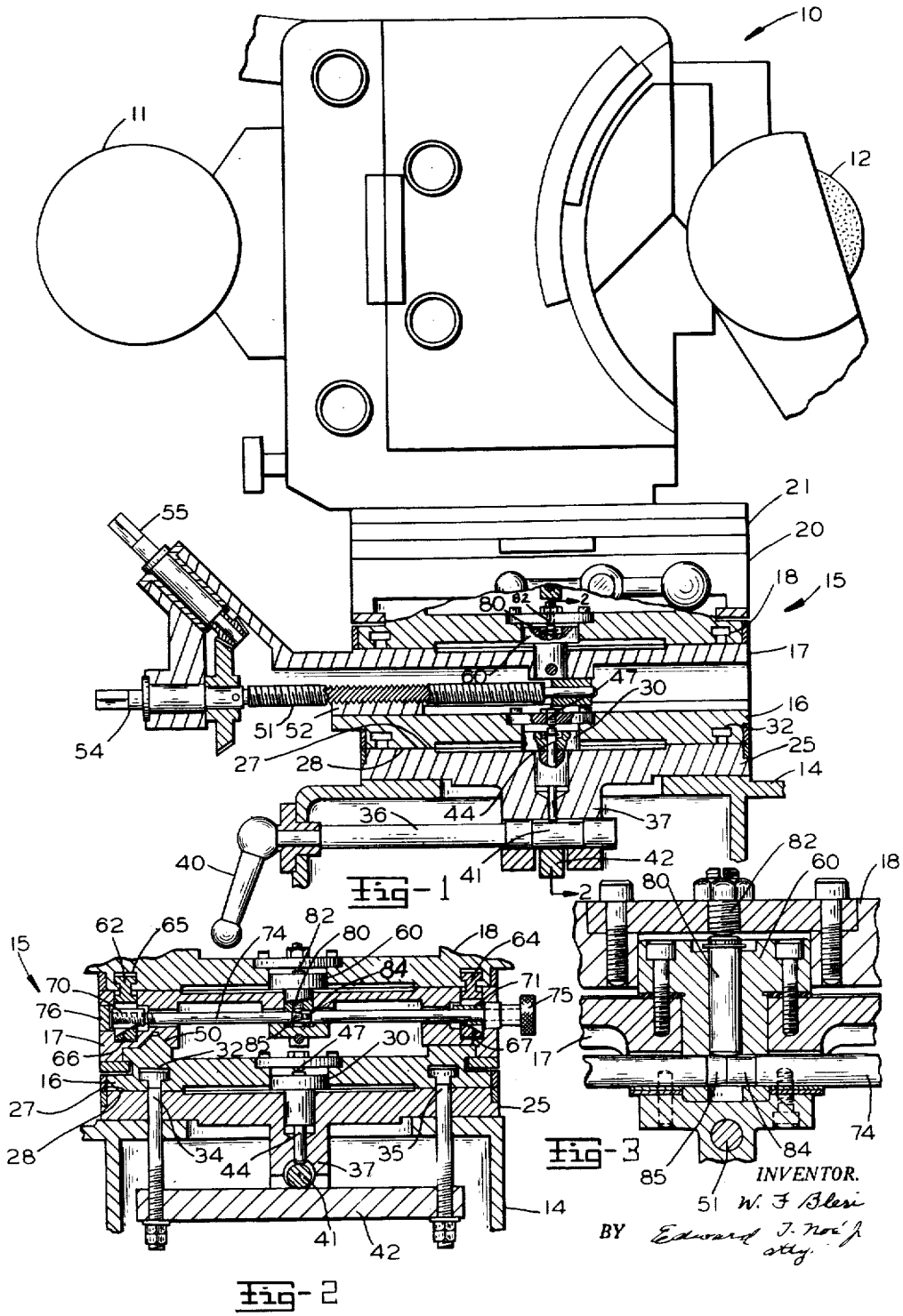

United States Patent Office 2,805,527
Patented Sept. 10, 1957

2,805,527
MACHINE TOOL

Walter F. Blesi, Dayton, Ohio, assignor, by mesne assignments, to The Sheffield Corporation, a corporation of Ohio Application September 6, 1955, Serial No. 532,634

8 Claims. (Cl. 51—166)

This invention relates to machine tools and more particularly to apparatus for clamping and for freeing machine tool components for easy and precise adjustment.

It is an object of this invention to provide an apparatus for readily freeing engaging surfaces of machine tool components such as wheel or workhead slides, turntables and the like, in a simple and efficient manner for easy adjustment to precise positions as desired.

It is a further object to provide such an apparatus whereby through a simple actuation of a single adjustment the machine components are first unclamped and then freed from one another through breaking of surface adhesion, in that sequence, and by means of structure which is simple in construction, economical to make, and reliable for continued repeated use over a long service life.

It is a further object to provide such a structure wherein a freeing plunger is carried for movement in one of the components and for abutting engagement with a stop on the other component, one end of the plunger being engagable by a cam surface on an actuating member which also serves to actuate the clamping structure.

Other objects and advantages of the invention will be apparent from the following description, the appended claims and the accompanying drawing, in which, Figure 1 illustrates a machine tool embodying the features of the present invention shown partially in elevation and partially in vertical central section.

Figure 2 is a fragmentary sectional view taken on line 2—2 of Figure 1, and

Figure 3 is an enlarged fragment of Figure 2.

For illustrative purposes the present invention has been illustrated as embodied in the support for the wheel head 10 of a precision grinder. This wheel head 10 carries a driving motor 11 for grinding wheel 12 and is supported from a machine base 14 through a compound turntable and slide arrangement 15. A machine of this type is disclosed in U. S. Patent Number 2,465,038 issued March 22, 1949.

This precision supporting structure is provided for accurate adjustment of the position and line of movement of the grinding wheel 12 for accurately grinding a workpiece mounted in a workholder not shown.

The compound wheel head support includes a lower turntable 16 supporting a transverse slide 17. Slide 17 in turn mounts a middle turntable 18, carrying an upper slide 20 for movement substantially at right angles to slide 17. Slide 20 in turn mounts the uppermost turntable 21 from which the basic structure of wheel head 10 is carried. In order to provide a rigid support for precision adjustment of wheel head 10, each of the turntables 16, 18 and 21 have lower surfaces which are parallel to and engage opposing surfaces of their immediate supports. Due to the fine finish necessary on these engaging surfaces, the force of the clamping structure, and the weight of the wheel head 10, after the mating surfaces have remained in a given adjusted position they will tend to stick or adhere together. This makes precision adjustment difficult. Through the provision of the present invention structure has been provided for automatically unsticking these joining surfaces by separating them minutely prior to their relative adjustment. In the illustrated device this structure has been so coordinated with the releasable turntable clamps that with a single adjustment the clamps are released and the joining surfaces are broken apart.

Referring more particularly to the drawing, it will be seen that base casting 14 supports a bottom plate 25. Turntable 16 is supported on bottom plate 25 through the engagement of opposed surfaces 27 and 28. The turntable is journaled or guided for rotation on a pilot 30 which has a reduced lower end carried in plate 25.

Turntable 16 has an annular T-groove 32 in its lower surface into which the heads of clamps 34 and 35 extend. Structure supported by bottom plate 25 is provided for drawing these clamps downward to lock the turntable in its adjusted positions on plate 25. This portion of the clamping structure is conventional and is utilized in each of the turntable arrangements of the illustrated machine.

A clamping shaft 36 is journaled for rotation at its outer end in base 14 and at its inner end in a downward extension 37 of bottom plate 25. This shaft is actuated by handle 40 projecting from the machine base.

Shaft 36 has a portion at 41 which is eccentric to the axis of rotation of the shaft and extends between and engages a clamping bar 42 and a freeing plunger 44. Freeing plunger 44 is carried for axial sliding in pilot 30 and engages eccentric 41 with its lower end, extending upward into opposed relationship with a stop 47 on the lower turntable 16. In this arrangement when handle 40 is moved to rotate shaft 36 and lower eccentric 41, clamping bar 42 is cammed downward drawing clamps 34 and 35 into engagement with annular groove 32, clamping surfaces 27 and 28 together to lock turntable 16 in position.

After engagement surfaces 27 and 28 will tend to adhere. In releasing turntable 16 for adjustment on plate 25, handle 40 is moved to raise this eccentric. It will be seen that during the upward movement of eccentric 41 clamping bar 42 and clamps 34 and 35 will be released. Sequentially following this as eccentric 41 reaches or nears its upper position it will force plunger 44 upward into engagement with stop 47. The arrangement is such that turntable 16 is lifted slightly relative to plate 25, breaking the adhesion between the surfaces 27 and 28 and freeing the turntable for ready adjustment. Thus a sequential operation is carried out through a simple movement of a single adjustment means. The turntable and plate are first unclamped and then are freed, in that sequence, in an extremely simple manner and through the use of a simple and rugged structural arrangement.

Slide 17 is supported on turntable 16 and is guided for its movement by guideway 50 seen in Figure 2. The slide carries an adjusting screw 51 which is in engagement with a half nut 52 fixed to turntable 16. Through rotation of connection 54 for rapid traverse or connection 55 for slow, precise movement, slide 17 is adjusted on turntable 16.

Turntable 18 is supported on slide 17 through cooperating parallel engaging surfaces and is guided for its rotation by means of a pilot 60 in a manner similar to that for the relationship between turntable 16 and plate 25.

Clamps 62 and 64 have their heads in an annular T-shaped groove 65 in turntable 18. These clamps extend downward and have openings providing inclined cam surfaces 66 and 67, respectively, in engagement with wedge clamp 70 and 71 on clamping shaft 74. Shaft 74 is threaded into wedge clamp 70 and has a knob 75 at the outer end thereof by which the wedge clamps 70 and 71 can be drawn together to cam clamps 62 and 64 downward for clamping purposes. Wedge clamp 71 engages a shoulder forming a part of the shaft.

A freeing plunger 80 slidable in pilot 60 has its upper end in opposed relationship to a stop 82 fixed to turntable 18. At substantially its midpoint shaft 74 has a reduced portion providing cylindrical segment 84 and a conical segment 85, both provided for association with the lower end of freeing plunger 80. Upon rotation of knob 75 to draw clamping wedges 70 and 71 together to force clamps 62 and 64 downward, plunger 80 will move into association with reduced cylindrical portion 84 of shaft 74. Through this means the plunger 80 is released as clamping is accomplished.

When it is necessary to free turntable 18 relative to slide 17, knob 75 is rotated in the reverse direction, expanding wedge clamps 70 and 71 to release clamps 62 and 64, following which wedge clamp 70 engages end plate 76, shaft 74 moves to the right and conical surface 85 will move into association with the plunger 80, camming it upward into engagement with stop 82 to raise turntable 18 minutely and break its adhesion to slide 17. A structural arrangement similar to this is provided for the clamping and freeing of turntable 21.

Thus it is seen that extremely simple and reliable means have been provided for the clamping together of machine tool supporting components and for freeing the components for easy, precise adjustment. Through application of the present invention release of the clamping means and a breaking apart of surfaces held together by adhesion is accomplished in a simple manner.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A machine tool or the like comprising a pair of components adjustable to different relative positions, said components having engaging parallel surfaces tending to adhere, force applying means cooperating between said components including a slidable plunger, stop means on one of said components opposing one end of said plunger, and actuating means operatively connected to said force applying means including manually actuated cam means in association with the other of said components and engageable with the other end of said plunger and for actuation thereof to separate said surfaces and free the components for relative adjustment.

2. A machine tool or the like comprising a pair of supporting components adjustable to different relative positions, said components having engaging parallel surfaces tending to adhere, clamping means for locking the components together in their relatively adjusted positions, force applying means cooperating between the components for separating the surfaces for free relative movement, and actuating means operatively connected to both said clamping means and said force applying means to release the clamping means and then automatically actuate the force applying means to separate and free the surfaces, in that sequence, for relative adjustment of the components and to sequentially disable the force applying means and then clamp the components together following adjustment, whereby the force applying means is not operative in opposition to said clamping means.

3. A machine tool or the like including a lower component, an upper component adjustable on said lower component to different relative positions, said components having engaging parallel surfaces tending to adhere, clamping means for drawing the upper component toward the lower component for locking the components in their relatively adjusted positions, means for actuating said clamping means to clamp and unclamp said components, force applyng means cooperating between said components for lifting the upper component to break the surface adhesion between the components and allow their relative movement, and a single manual adjustment operatively connected to both said clamping means and said force applying means for releasing said clamping means and then actuating said force applying means, automatically in that sequence, whereby the force applying means is not operative in opposition to said clamping means.

4. A machine tool or the like including a lower component, an upper component supported on said lower component for rotation to different relative positions therebetween, means cooperating between said components guiding said upper component in its rotary movement, said components having engaging parallel surfaces tending to adhere, clamping means cooperating between the components for drawing the components firmly into engagement whereby the components are locked in their relatively adjusted positions, a plunger carried in said lower component coaxially with the axis of relative rotation, stop means on said upper component in opposed relationship to the adjacent end of the plunger, and a common actuating means operatively connected to said clamping means and associated with the other end of said plunger to release the clamping means and then move the plunger upward to separate the surfaces, in that sequence, to free the components for easy relative rotation as desired.

5. A machine tool or the like comprising a pair of components adjustable to different relative positions, said components having engaging parallel surfaces tending to adhere, clamping means for fixing said components against relative adjustment, means for actuating said clamping means to clamp and unclamp said components, a plunger guided in one of said components for axial movement, stop means on the other of said components in opposed relationship to the adjacent end of the plunger, actuating means for moving said plunger into engagement with said stop means including cam means in association with the other end of said plunger, whereby the surfaces are separated and the components are freed for relative adjustment, and a single manually rotatable adjustment connected to both said actuating means for automatic unclamping and separating, in that sequence, for adjustment.

6. A machine tool or the like including a lower supporting component, an upper supporting component mounted thereon for rotation to different relatively adjusted positions, means cooperating between said components guiding said upper component for rotation, said components having engaging parallel surfaces tending to adhere, clamping means for drawing the surfaces together to lock the components in their relatively adjusted positions, a plunger guided for movement along the axis of relative rotation, stop means on the upper of said components in opposed relationship to one end of said plunger, and actuating means operatively connected to said clamping means including cam means in association with the other end of said plunger for axial movement thereof to engage said stop means and separate said surfaces for releasing the clamp means and actuating the plunger to free the surfaces, in that sequence, for easy relative adjustment of the components.

7. A machine tool or the like including a pair of supporting components adjustable to different relative positions, said components having engaging parallel surfaces tending to adhere, clamp means cooperating between said components and operative to draw the surfaces together and lock the components against relative movement, interconnection means extending between said clamp means for actuation thereof, a plunger mounted in one of said components and stop means on the other in opposed relation to one end of said plunger, a rotatable shaft having an eccentric portion along its length positioned between the other end of said plunger and said interconnection means, and means to rotate said shaft to swing said eccentrc to one extreme to engage said interconnection means to actuate the clamp means and lock the components together and to the other extreme to release the interconnection means and engage and move said plunger into engagement with said stop means for unsticking the surfaces, whereby the clamp means are released and the surfaces are freed, in that sequence, for free adjustment between the components.

8. A machine tool or the like including a pair of supporting components adjustable to different relative positions, said components having engaging parallel surfaces tending to adhere, clamps cooperating between said components and movable in one direction to draw the surfaces together into intimate contact and lock the components against relative movement, a plunger movable in one of the components toward and from the other, stop means on the other of said components in opposed relationship to one end of said plunger for engagement therewith to separate the surfaces and free the components for relative adjustment, a clamping bar carried by one of said components for axial movement, means carried by said bar cooperating with said clamps for actuation thereof upon movement of said bar, said bar having a tapered cam surface along its length in association with the other end of said plunger, whereby upon axial movement of said bar the clamps are released and the tapered surface brought into forceful engagement with the plunger to free the surfaces for relative adjustment of the components.

References Cited in the file of this patent

UNITED STATES PATENTS 2,615,288    Klay et al.    Oct. 28, 1952

FOREIGN PATENTS 668,095    Great Britain    Mar. 12, 1952

UNITED STATES PATENT OFFICE
CERTIFICATE OF CORRECTION

Patent No. 2,805,527 September 10, 1957

Walter F. Blesi

It is hereby certified that error appears in the above numbered patent requiring correction and that the said Letters Patent should read as corrected below.

In the grant, line 3, and in the heading to the printed specification, line 5, State of incorporation, for "Ohio" read -- Delaware --.

Signed and sealed this 5th day of November 1957.

(SEAL)
Attest:

KARL H. AXLINE
Attesting Officer

ROBERT C. WATSON
Commissioner of Patents